US008304066B2

(12) United States Patent
Anderson et al.

(10) Patent No.: US 8,304,066 B2
(45) Date of Patent: Nov. 6, 2012

(54) TONER RELEASE COATING

(75) Inventors: Richard Kent Anderson, Georgetown, KY (US); Martin Victor DiGirolamo, Lexington, KY (US); Mark William Johnson, Lexington, KY (US); David Starling MacMillan, Winchester, KY (US); Robert Watson McAlpine, Lexington, KY (US); Donald Wayne Stafford, Lexington, KY (US); Jason Carl True, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1098 days.

(21) Appl. No.: 11/972,962

(22) Filed: Jan. 11, 2008

(65) Prior Publication Data

US 2009/0181236 A1 Jul. 16, 2009

(51) Int. Cl.
*B32B 5/16* (2006.01)

(52) U.S. Cl. ........................................................ 428/323

(58) Field of Classification Search ................... 428/323
See application file for complete search history.

(56) References Cited

U.S. PATENT DOCUMENTS

| | | | | |
|---|---|---|---|---|
| 5,177,537 | A * | 1/1993 | Okano et al. | 399/222 |
| 5,450,184 | A * | 9/1995 | Yanai et al. | 399/350 |
| 5,708,943 | A | 1/1998 | Applegate et al. | |
| 6,649,573 | B2 | 11/2003 | Mitrovich | |
| 6,990,308 | B1 | 1/2006 | McAlpine et al. | |
| 7,030,065 | B2 | 4/2006 | Lockett, Sr. | |
| 2005/0201781 | A1 | 9/2005 | MacMillan et al. | |
| 2005/0214033 | A1 | 9/2005 | MacMillan et al. | |
| 2005/0220500 | A1 | 10/2005 | DiGirolamo et al. | |
| 2007/0041751 | A1 | 2/2007 | Baker et al. | |

OTHER PUBLICATIONS

Oxford English Dictionary, doctor definition, second edition, 1989 downloaded online Feb. 14, 2011.*

* cited by examiner

*Primary Examiner* — Elizabeth A Robinson

(57) ABSTRACT

A toner release coating may be applied to a toner regulating member such as a doctor blade. The toner release coating may reduce toner adhesion at a doctoring pre-nip location of the doctor blade. The toner release coating may be formed from a mixture of lubricating particulate and polymeric binder resin in a liquid carrier.

18 Claims, 3 Drawing Sheets

TONER RELEASE COATING

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present disclosure relates generally to a toner release coating that may be applied to a toner regulating member such as a doctor blade which may reduce toner adhesion in a doctoring pre-nip location.

2. Description of the Related Art

Image forming devices, such as printers, copiers, fax machines, etc., utilize a number of components to transfer toner from a toner reservoir to a photoconductor and ultimately to a sheet of paper, or other media. For example, a photoconductor may be charged utilizing a charging device and selectively discharge to form a latent image thereon. Toner may then be transferred onto the photoconductor from the reservoir via differential charging of the photoconductor, toner and developer rollers or transfer rollers. From the photoconductor, toner may then be deposited onto a sheet of paper, creating the desired image. The transferred toner may then be fused to the paper by a fuser or other fixation device.

One step in the electrophotographic printing process generally involves providing a relatively uniform layer of toner on a toner carrier, such as a developer roller, that in turn supplies that toner to the photoconductive element. Typically, it is advantageous if the toner layer has a uniform thickness and a uniform charge level. One approach to regulating the toner on the toner carrier is to employ a so-called doctor or metering blade. However, problems may develop due to adhesion of the toner to the doctor blade which may then interfere with the overall doctoring procedure.

SUMMARY OF THE INVENTION

An aspect of the present disclosure relates to a toner regulating device having a surface comprising a coating disposed on said surface of the device wherein the coating comprises a binder and lubricating particulate. The coating may have a thickness of less than or equal to 10.0 microns.

Another aspect of the present disclosure relates to a doctor blade having a surface configured to form a nip and a pre-nip region with a toner carrier comprising a coating disposed on the surface of the doctor blade at the pre-nip region. The coating comprises a binder and lubricating particulate where the particulate has a cross-sectional dimension of less than or equal to 2.0 microns and the coating may have a thickness of less than or equal to 10.0 microns Another aspect of the present disclosure relates to a toner layer regulating system for an electrophotographic image forming device comprising a toner carrier and a toner regulating member supported against the toner carrier providing a nip region and pre-nip region and a coating covering the pre-nip region. The coating may again include a binder and a plurality of lubricating particles, wherein the particles may have a size of less than or equal to 2.0 microns and the coating may have a thickness of less than or equal to 10.0 microns.

Another aspect of the present disclosure relates to a method for coating a toner regulating device comprising supplying a mixture of lubricating particulate and binder in a liquid carrier. The lubricating particulate may be present at less than or equal to 1.0 percent by weight and the mixture may have a viscosity of less than or equal to 50 cP. This may then be followed by coating a toner regulating device and removing the liquid carrier and forming a coating having a thickness of less than or equal to 10.0 microns.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
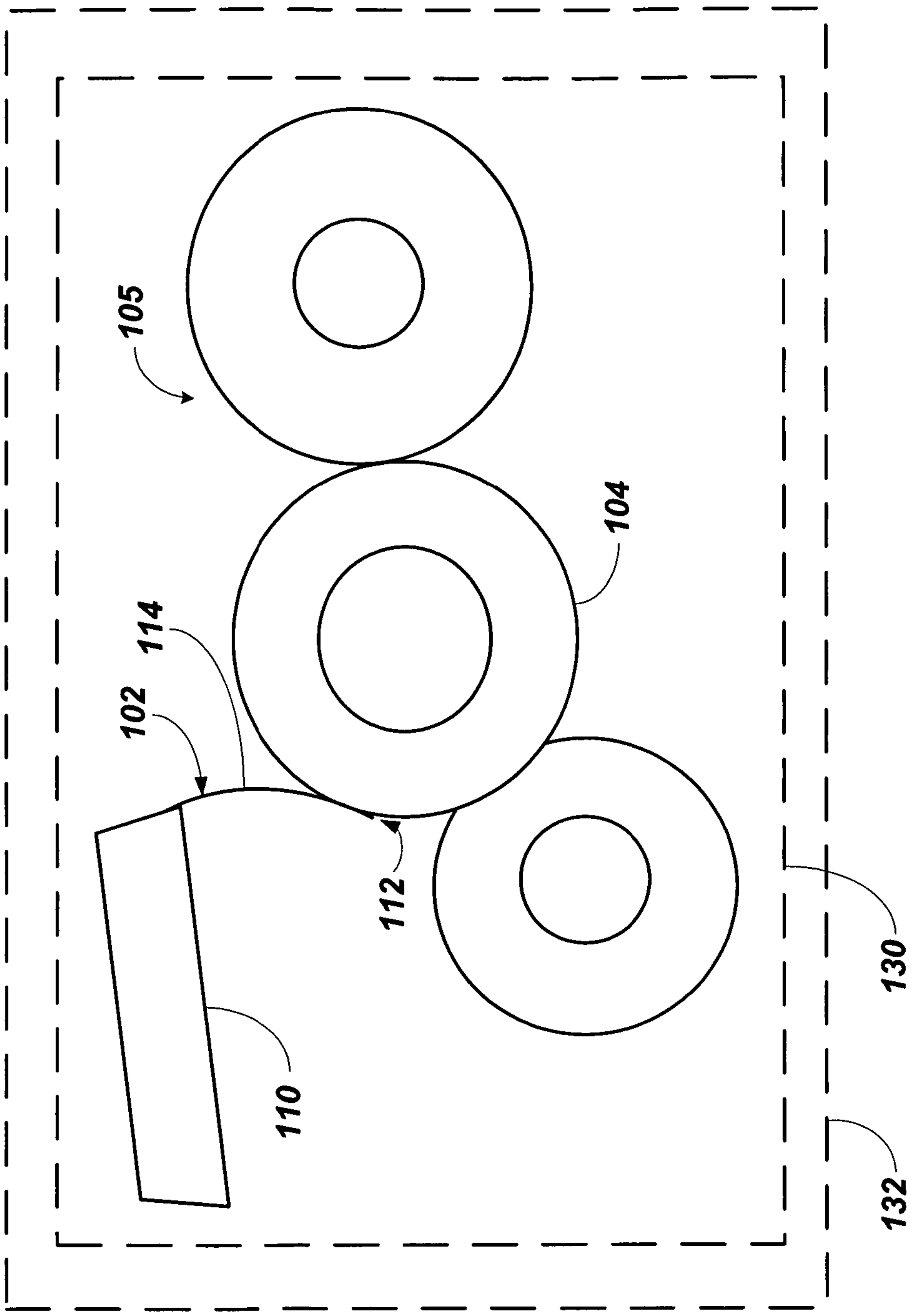
FIG. 1 is a schematic drawing of an example of a toner carrier and a toner regulating device in an image forming device.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As illustrated in FIG. 1, during the transfer of toner in an image forming device, a toner regulating device, such as a doctor blade, 102 may interact with a toner carrier, such as a developer roller 104, to regulate the thickness of toner deposited onto the developer roller 104 which in turn supplies toner to the photoconductive roller 105. The toner regulating blade 102 may be positioned relative to the developer roller 104 on a bracket 110. Thus, the regulating blade may include a mounting portion, which may mount on the bracket 110 and a metering portion, which may form a nip 112 with the developer roll 104. The nip may therefore be understood to be that location where the toner regulating device surface 114 and toner carrier are in contact. In addition, at the nip location, the toner regulating blade may be configured to contact the toner carrier and press against the carrier with a desired force per unit length. Such force may be about 0.08-1.0 N/mm.

Figure 2:
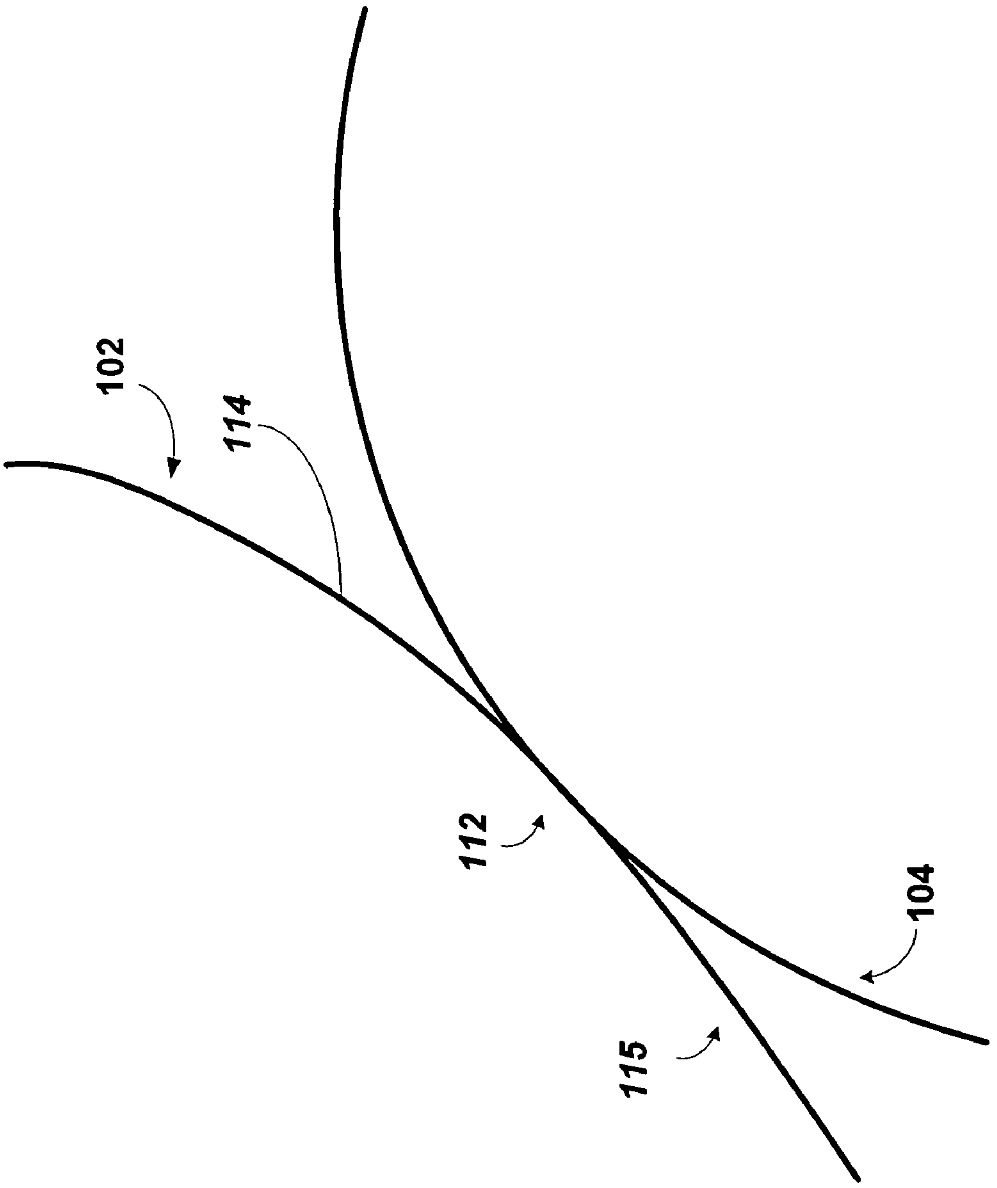
FIG. 2 is a schematic drawing providing an expanded exemplary view of the pre-nip region and nip region between the toner regulating device and toner carrier.

A more exploded cut-away view of the toner regulation device is provided in FIG. 2. As can now be seen, the nip 112 can be more clearly identified as that general region where the surface 114 of toner regulating device is in contact with the surface of the developer roll 104. Such nip may have a length of about 0.5 to 1.5 mm. In addition, as may now be appreciated, a pre-nip region may be present, illustrated generally at 115, which corresponds to that region where the toner regulation device 102 is not in contact with the roller 104. Such pre-nip region may have a length of about 0.25 mm to 2.5 mm.

With the above in mind, it may now be appreciated that during a given printing operation, toner, which is typically a relatively fine powder containing polymeric resin, pigment and other additives, is transferred from a toner bin (not shown) to the photoconductor through the nip formed between the developer roller 104 and regulating (doctor) blade 102. However, during use, it has been observed that toner may actually adhere to the surface of the toner regulating member at those regions that are not in contact with the developer roller, such as in the in the pre-nip region noted above. This may be caused by local heat build-up due to the frictional engagement at the nip between the blade and roller surface which may then cause the toner to bind to the surface 114. This may be specifically the result of exceeding a given glass transition or Tg value of those polymer resins that may be used in a selected toner formulation. Such adhesion and build-up of toner may then interrupt the amount of toner that may be provided on the developer roller, and result in what may be known as skid-mark defects on the printed media (i.e. areas where there is not toner).

Accordingly, a toner release coating may now be applied to the surface 114 of the blade 102, wherein such release coating may prevent toner adhesion to the blade in the pre-nip region, as described above. Such toner release coating may first include a lubricating particulate, such as graphite, molybdenum disulfide ($MoS_2$), tungsten disulfide ($WS_2$), boron nitride (BN) and/or a fluoropolymer, including mixtures thereof. Such particulate may then be combined with a binder, described more fully below, in the presence of a liquid, which combination may then be applied to and made to adhere to a selected region of the blade surface, along with removal of the carrier liquid. Reference herein to lubricating particulate may therefore be understood as a reference to materials which in the form of a relatively dry powder may be effective as a lubricant on a given surface. Reference to a fluropolymer may be understood as any polymeric material containing C-F type functionality, which therefore would include poly(tetrafluroethylene) or —$CF_2$—$CF_2$— type repeating units. The lubricating particulate may have a diameter or largest cross-sectional dimension of less than or equal to 2.0 microns. For example, the particulate may have a diameter or largest cross-sectional dimension of between 0.01-2.0 microns, including all values and increments therein.

As alluded to above, the particulate may be supplied in a liquid carrier (water or an alcohol) one example of which includes colloidal graphite, having an average flake size of about 1.0 micron, which is available by Marivac, St. Laurent Quebec, Canada. In addition, one may utilize a colloidal graphite available from Structure Probe Inc., West Chester, Pa.

The binder herein may include a polymer resin, including both thermoplastic and/or thermoset (crosslinked) type materials. For example, the binder may include one or more of the following: polyesters, polyethers, polyurethanes, polycarbonates, polyacrylates, polyamides, polyvinyl alcohols, polyvinyl acetates, polyvinyl chlorides and/or epoxy type material. It may be appreciated therefore that an epoxy type material is one example of a thermoset resin. Other thermoset resins may include crosslinked polyesters or phenolic based resins. In addition, the binder may be provided as a latex or dispersion of the identified polymers, wherein the polymer may therefore be dispersed in an aqueous phase, along with appropriate surfactants. Accordingly, a binder herein may be understood as any material, typically of relatively high average molecular weight (e.g. a number average molecular weight or Mn of $\geqq$1000) that is capable of adhering to the surface of the toner regulating device such that they may serve to retain the lubricating particulate on the device surface to provide their associated lubricating characteristics.

The lubricating particulate (when supplied as a dry particulate) and binder may therefore be combined in a liquid carrier, wherein the lubricating particulate may be introduced up to about a 1.0% by weight loading to the overall mixture. Accordingly, the lubricating particulate may be introduced at a level of between 0.1% to 1.0% by weight, including all values and increments therein. As noted above, the lubricating particulate may include any one or more of the indicated materials (graphite, molybdenum disulfide ($MoS_2$), tungsten disulfide ($WS_2$), boron nitride (BN) and/or a fluoropolymer) wherein the combination of material provides the 1.0% by weight loading just noted. Accordingly, one may utilize, e.g., 0.50% by weight of molybdenum disulfide and 0.50% by weight of boron nitride. In addition the polymeric binder may be introduced into the liquid at a level of about less than or equal to about 35% by weight. For example, the polymeric binder may be introduced in the liquid at a level of about 0.1-35% by weight, including all values and increments therein.

The liquid medium for the binder and lubricating particulate may include water or an organic alcohol, such as isopropanol or any other organic solvent that will readily evaporate and provide the desired release coating characteristics. The liquid medium may also include a mixture of solvents, wetting agents, dispersants or surfactants that may assist in providing a uniform thickness to the coating on a given toner regulating device surface.

The particulate and binder in the liquid medium may be specifically configured such that they provide a relatively low viscosity, such as a viscosity of less than or equal to 100 centipoise (cP). For example, the viscosity may be adjusted to a value of less than or equal to 50 cP, or to a value between 10-50 cP, including all values and increments therein. The coating may be applied by spray coating or roll coating procedure. In such manner it may now be appreciated that the lubricating particulate and binder may be applied to all or a selected region of the regulating doctor blade 102 such that the coating thickness after removal of the liquid is less than or equal to 10.0 microns. For example, the coating may have a thickness of 0.1-10.0 microns, including all values and increments therein, such as between 0.1 to 5.0 microns. In addition, as noted above, the coating may be uniform, e.g., the coating may be present in the pre-nip region at a thickness of 2.5 microns, +/−0.25 microns. The coating herein may also be characterized as one which provides a static coefficient of friction of 0.25 or less, including any values and increments in the range of 0.01 to 0.25.

Figure 3:
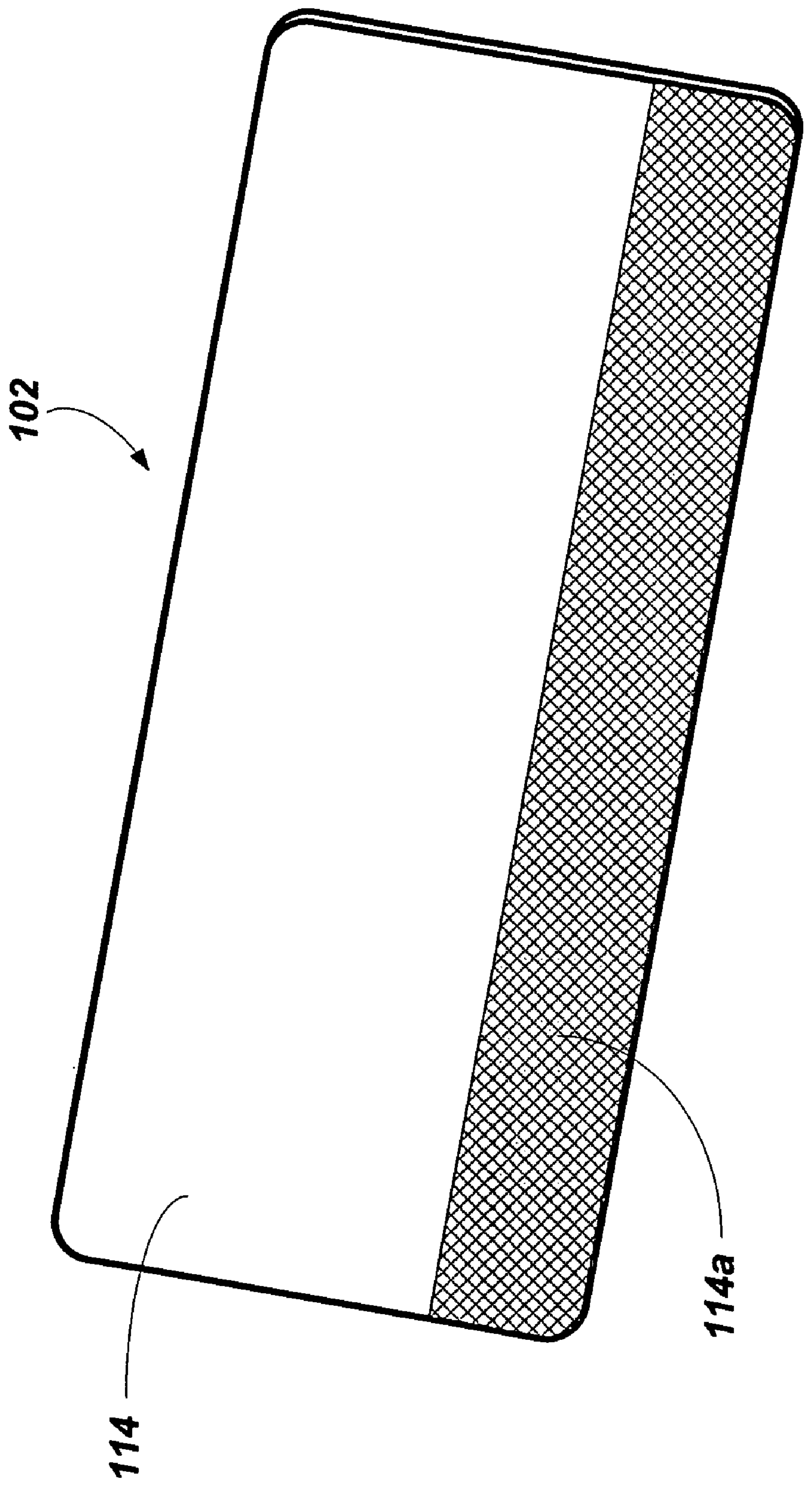
FIG. 3 is a drawing of an exemplary toner regulating device and a selected location where the toner release coating herein may be applied.

Attention is therefore directed to FIG. 3, which illustrates that the regulating doctor blade 102 may have a general rectangular form formed from a substrate material (e.g. metal or polymer material, such a MYLAR®). In addition, the toner release coating herein may be applied to the surface 114 of the doctor blade specifically at region 114*a*, which region may then ultimately define the area of the nip region and pre-nip region, when engaged with a roller, as noted above. However, as also alluded to above, and in the context of the present disclosure, and while not necessarily preferred, the toner coating herein may be applied to the entire doctor blade surface 114 and such coating may be the only coating on the blade, or a subsequent coating to some underlying coated layer, which underlying coating layer may separately provide some desirable surface roughness, as described more fully below.

It is useful to recognize that the coating herein, when positioned at the doctoring nip 112, is capable of being removed due to the abrasion which occurs within such region. Such removal of the coating at the doctoring nip region 112 may occur in a relatively short period of time (less than or equal to about 30 seconds), which may in part be due to the relatively thin nature of such coatings, noted above ($\leqq$10.0 microns). In addition, such coating removal may be designed to occur during the initial manufacturing run or testing of a given printer. That being the case, the constituents of the toner release coating herein, and their relatively reduced amount, will not adversely effect toner charging once a given cartridge undergoes an initial print cycle.

The abrasion referenced above may be the result of frictional engagement of the doctor blade surface with the surface of the roller 104 and/or the friction that may be developed as between the doctor blade surface and toner particulate. Accordingly, whatever surface texture of the doctor blade that may be provided, which surface texture may be selected to improve the doctoring performance, such surface texture at the nip region may not be altered by the toner release coatings herein. That is, the toner release coating at the nip region is removed as noted above, thereby exposing that surface roughness that was intended to be available at the nip for doctoring purposes. However, the toner release coating remains on all other surfaces 114 of the doctor blade, thereby preventing toner adhesion, and the associated problems with such adhesion, noted above.

Along such lines, reference is made to commonly assigned U.S. patent application Ser. No. 10/809,123 entitled "Electrophotography Toner Regulating Member With Polymer Coating Having Surface Roughness Modified By Fine Particles", whose teachings are incorporated by reference. As described therein, it may be desirable to provide a toner regulating member that is coated to provide a surface roughness in the range of 0.15 μm to 1.5 μm Ra and 1.0 to 15.0 μm Rz. In measuring such surface roughness, the surface profile may be plotted and a mean line is generated. The Ra may be understood as the average deviation of the true surface from the theoretical mean surface across the assessment length. The Rz may be understood as the average of the vertical distance from the highest peak to the lowest valley within a given number of sampling lengths. Accordingly, the toner release coatings herein may be applied to such a toner regulating member and do not interfere with the ability to provide such surface roughness at the nip region, while nonetheless reducing the tendency of the toner from adhering to the blade at other locations, such as the pre-nip region 115.

It may be appreciated that the regulating blade 102, developer roller 104, and photoconductor 106 may all be located within a given toner cartridge 130. See again, FIG. 1. The toner cartridge 130 may be removable from an image forming device 132 and may itself include a reservoir for storing toner. Accordingly, the individual components, i.e., the regulating blade, developer roller or photoconductor, may all ultimately be located directly within an image forming device 132.

It is also noted, that while reference herein is made to a regulating blade and developer roller, various other toner regulating devices and toner carrier devices may be contemplated. For example, toner regulating devices may include a toner agitator, which may agitate the toner within a toner cartridge. The toner regulating device may include other rollers, such as a transfer roller, which may transfer toner from the toner reservoir to the developer roller. In addition to developer rollers, toner carrier devices may include toner reservoirs whose surfaces may also benefit from the toner release coating disclosed herein.

Upon application of the toner release coating herein to a doctor blade in a Lexmark E250, E35X, or E450 electrophotographic black & white printer, it was observed that there was about a 50% reduction in skid marks. In addition, application of the toner release coating herein to a doctor blade in a Lexmark C52X or C53X color laser printer indicated about a 70% reduction in skid marks. In other cases, such results were achieved without any reduction in print quality.

The foregoing description of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A toner regulating device having a surface comprising:

a coating disposed on said surface of said toner regulating device, wherein said coating comprises a binder and lubricating particulate, wherein said coating has a thickness of less than or equal to 10.0 microns, wherein said lubricating particulate comprises boron nitride, and wherein said lubricating particulate further comprises a material selected from the group consisting of graphite, molybdenum disulfide, tungsten disulfide and fluropolymer, and wherein said coating is formed from a mixture comprising about 0.50% by weight of molybdenum disulfide, about 0.50% by weight of boron nitride and from about 0.10% to about 35% by weight of the binder in a liquid carrier.

2. The device of claim 1 wherein said binder comprises a material selected from the group consisting of polyester, polyether, polyurethane, polycarbonate, polyacrylate, polyamide, polyvinyl alcohol, polyvinyl acetate, polyvinyl chloride, thermoset polymer resins, and mixtures thereof.

3. The device of claim 1 wherein said lubricating particulate has a cross-sectional dimension of less than or equal to 2.0 microns.

4. The device of claim 1 wherein said toner regulating device comprises a doctor blade.

5. The device of claim 1 wherein said coating has a thickness of 0.1 microns.

6. The device of claim 1 positioned in a toner cartridge.

7. The device of claim 1 positioned in an image forming device.

8. The device of claim 1, wherein said device has a surface roughness of 0.15 microns Ra and in the range of 1 to 15 microns Rz.

9. A doctor blade having a surface configured to form a nip and a pre-nip region with a toner carrier, said doctor blade comprising:

a coating disposed on said surface of said doctor blade at said pre-nip region, wherein said coating comprises a binder and lubricating particulate, wherein said lubricating particulate comprises boron nitride, wherein said lubricating particulate has a cross-sectional dimension of less than or equal to 2.0 microns, wherein said coating has a thickness of less than or equal to 10.0 microns, and wherein said lubricating particulate further comprises molybdenum disulfide and wherein said coating is formed from a mixture comprising about 0.50% by weight of molybdenum disulfide, about 0.50% by weight of boron nitride and from about 0.10% to about 35% by weight of the binder in a liquid carrier.

10. The doctor blade of claim 9 wherein said binder comprises a material selected from the group consisting of polyester, polyether, polyurethane, polycarbonate, polyacrylate, polyamide, polyvinyl alcohol, polyvinyl acetate, polyvinyl chloride, thermoset polymer resins, and mixtures thereof.

11. The doctor blade of claim 9 wherein said toner carrier comprises a developer roller.

12. The doctor blade of claim 9 wherein said doctor blade surface at said nip region has a surface roughness of 0.15 μm Ra and in the range of 1 to 15 μm Rz.

13. The doctor blade of claim 9 positioned in a toner cartridge.

14. The doctor blade of claim 9 positioned in an image forming device.

15. The doctor blade of claim 9, wherein said coating has a thickness of 0.1 microns.

16. A toner layer regulating system for an electrophotographic image forming device comprising:

a toner carrier;

a toner regulating member supported against said toner carrier providing a nip region and pre-nip region; and a coating covering the pre-nip region, said coating comprising a binder and a plurality of lubricating particles, wherein said lubricating particles have a size of less than or equal to 2.0 microns, wherein said lubricating particles comprise boron nitride, wherein said coating has a thickness of less than or equal to 10.0 microns, and wherein said lubricating particles further comprise a material selected from the group consisting of graphite, molybdenum disulfide, tungsten disulfide and fluropolymer, and wherein said coating is formed from a mixture comprising about 0.50% by weight of molybdenum disulfide, about 0.50% by weight of boron nitride and from about 0.10% to about 35% by weight of the binder in a liquid carrier.

17. The system of claim 16 wherein said binder comprises a material selected from the group consisting of polyester, polyether, polyurethane, polycarbonate, polyacrylate, polyamide, polyvinyl alcohol, polyvinyl acetate, polyvinyl chloride, thermoset polymer resins, and mixtures thereof.

18. The system of claim 16, wherein said coating has a thickness of about 0.1 microns.

* * * * *